Figure 5:
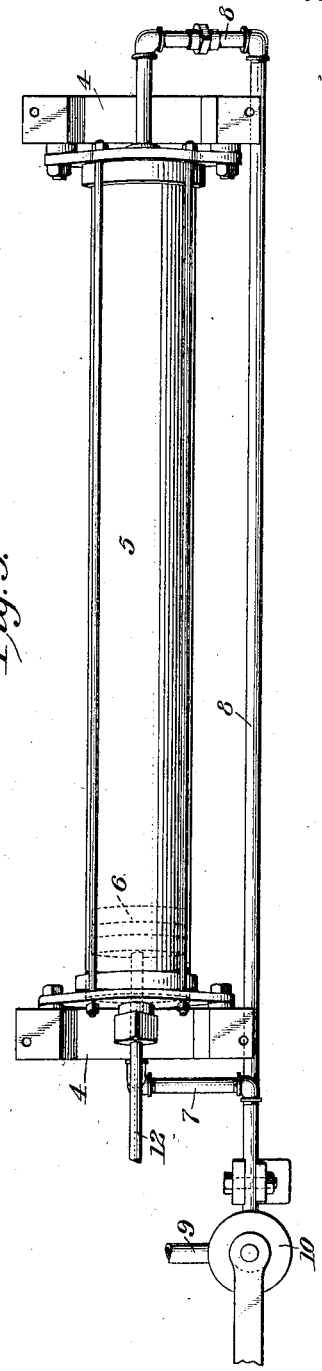

Dec. 16, 1924.
A. N. KELLEY
MOLD CONVEYER
Filed Nov. 8, 1921
1,519,844
3 Sheets-Sheet 1
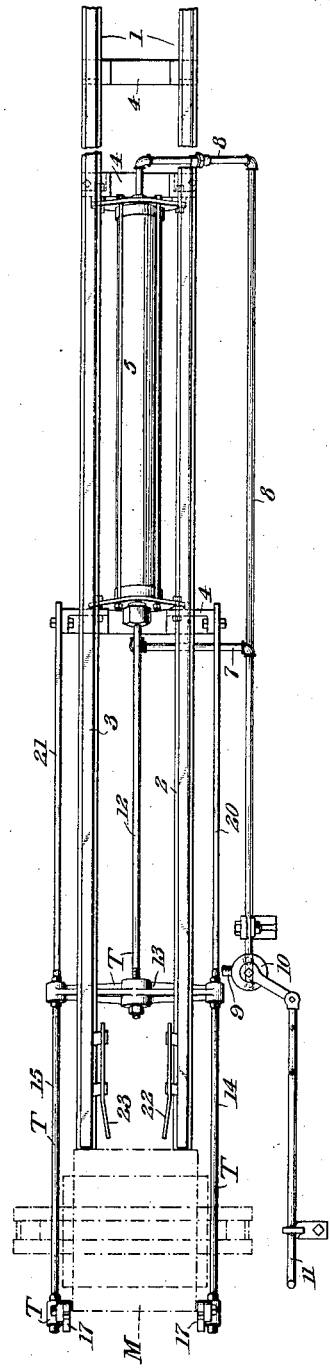
Inventor
Augustus N Kelley
By Albert F. Nathan
Attorney Dec. 16, 1924.
A. N. KELLEY
1,519,844
MOLD CONVEYER
Filed Nov. 8, 1921
3 Sheets-Sheet 2
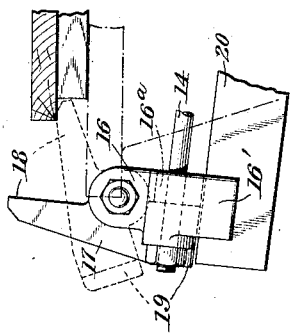
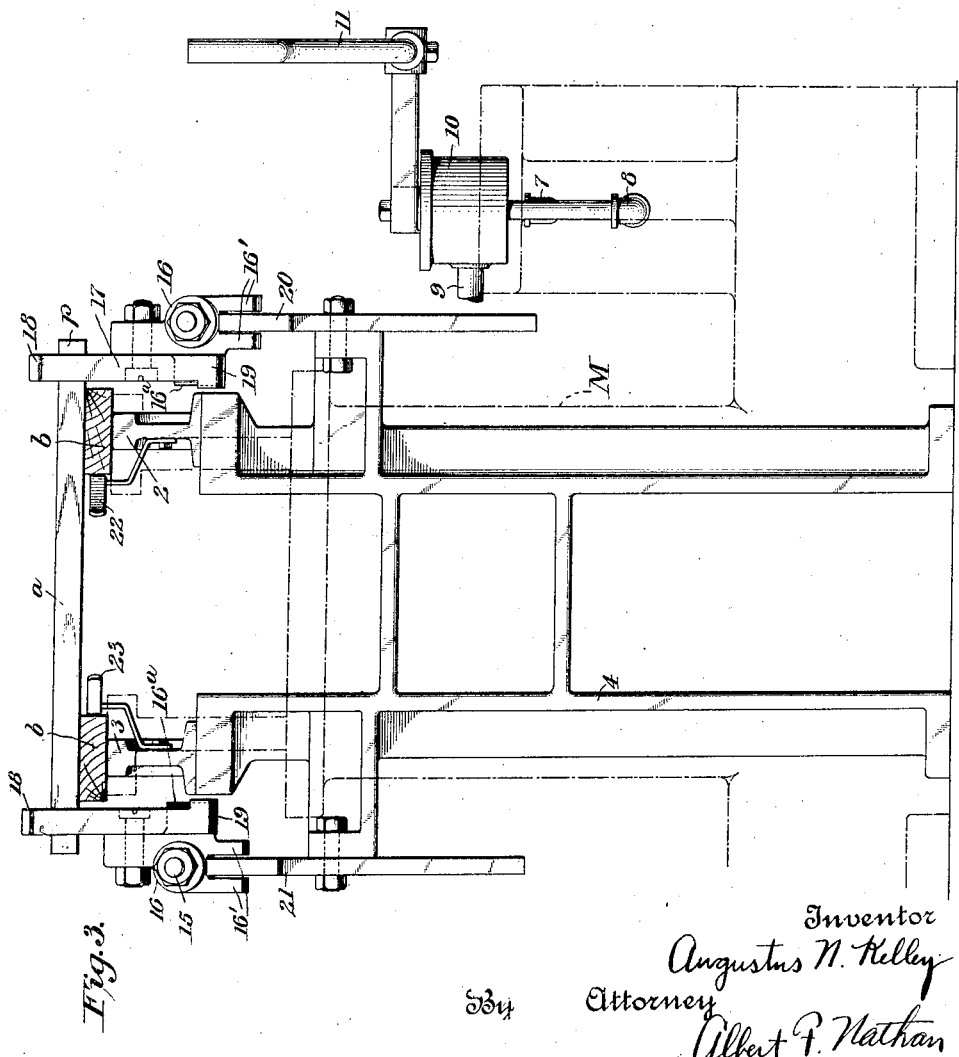
Inventor
Augustus N. Kelley
By Attorney
Albert F. Nathan Dec. 16, 1924.

A. N. KELLEY

MOLD CONVEYER

Filed Nov. 8, 1921

1,519,844

3 Sheets-Sheet 3

Inventor
Augustus N. Kelley
By Attorney
Albert P. Nathan

Patented Dec. 16, 1924.

1,519,844

UNITED STATES PATENT OFFICE.

AUGUSTUS N. KELLEY, OF CHICAGO, ILLINOIS, ASSIGNOR TO THE MODERN FOUNDRY COMPANY, OF CINCINNATI, OHIO, A CORPORATION OF OHIO.

MOLD CONVEYER.

Application filed November 8, 1921. Serial No. 513,757.

*To all whom it may concern:*

Be it known that I, AUGUSTUS N. KELLEY, a citizen of the United States, and residing at Chicago, in the county of Cook and State of Illinois, have invented a new and Improved Mold Conveyer, of which the following specification is a full disclosure.

This invention relates to conveying apparatus and is designed more particularly for use in connection with molding machines for removing the finished molds from the molding or sand pressing machines and delivering them to a suitable pouring station.

Heretofore it has been customary in foundry practice to form the molds in suitable molding machines and then manually transport the finished molds to a distant point where they are filled with molten metal. This manual transportation of the molds was laborious work and also materially increased the cost of the finished product.

The present invention has for an object to overcome the necessity of manually transporting the molds and thereby eliminate such arduous work, reduce the cost of manufacture and increase production.

A further object of the invention is to provide means for removing the molds from the molding machines, which means are free from vibrating or shaky parts, which, due to the nature of the work, would spoil the molds and thereby cause defective castings to be produced.

A still further object of the invention is to provide such transporting means entirely under the control of the operator of the molding machine at all times.

These and other objects of the invention are attained in a conveying apparatus including a track preferably, but not necessarily, inclined and having its higher and receiving end located directly behind the molding machine and adapted to receive the molds after they have been formed in the usual manner upon the usual pallets. Located beneath the track is a cylinder into which extends a rod having secured thereto a fluid actuated piston, controlled by the operator, through a suitable valve which regulates the flow and exhaust of liquid under pressure, to move the piston either forwardly or backwardly in the cylinder. One end of the piston rod is connected by a suitable cross-head to two rods, one at each side of the track and to each of these rods is pivotally attached a normally upstanding pawl adapted, in its forward movement, to engage the pallet upon which the mold is supported and remove it from the molding machine and convey it a short distance down the inclined track. When, through the manipulation of the valve, the piston and the pawls are returned to their forward position the upstanding ends of the pawls engage the pallet of a succeeding mold and the pawls are tipped about their pivots to permit them to pass under the pallet after which they assume their upright and effective position by gravity. Guides located between the rails of the track act upon the battens of the pallets and insure proper alignment of the molds on the track. It will be understood that the pallet of each of the molds as it is moved down the inclined track will contact with the pallet of the preceding mold and thereby the entire line of molds will be moved step by step as each mold is taken from the molding machine.

Figure 4:
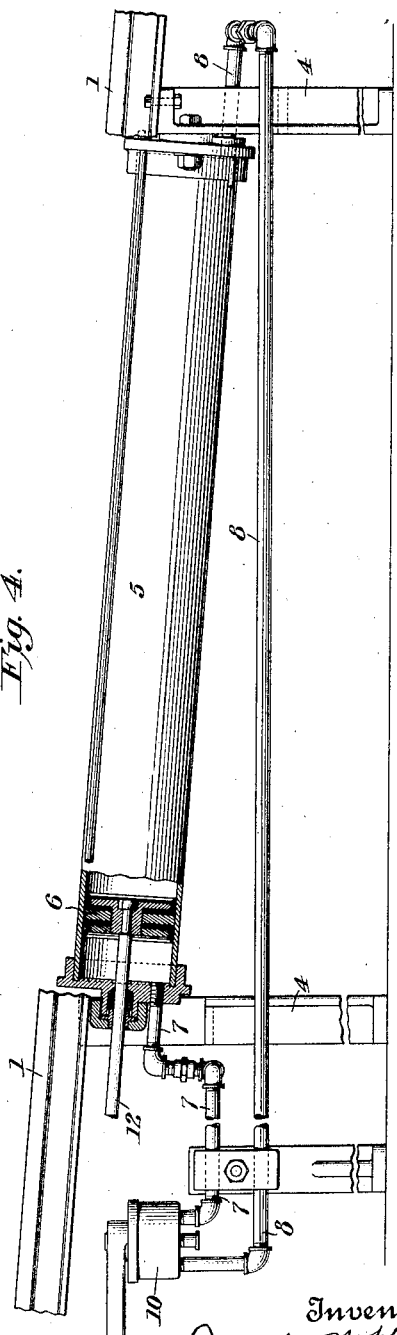

The invention is shown in its preferred form in the accompanying drawings in which Fig. 1 is a side elevation of the conveying apparatus showing it associated with a commercial form of molding machine, which latter is indicated by dot-dash lines. Fig. 2 is a plan view of Fig. 1. Fig. 3 is an end view on an enlarged scale. Fig. 4 is an enlarged side view, partly in section, of the pressure cylinder together with the means for controlling the movements of the mold transferring device, and several other associated parts. Fig. 5 is a plan view of Fig. 4 and Fig. 6 is a detail view showing in full lines one of the pallet engaging pawls and the support therefor and in dotted lines the ineffective position it assumes when passing under a pallet on its return movement preparatory to moving the mold.

Referring more particularly to the drawings, the conveying apparatus is located immediately behind a molding machine M of commercial form and comprises a track 1 consisting of spaced rails 2 and 3 supported upon suitable standards 4 which are preferably of varying heights. The track 1 is preferably inclined downwardly and rearwardly from the work-table of the molding machine and the molds conveyed therealong are thereby gradually brought down to the level at which the pouring of the molten metal into the molds may conveniently be done. If desired, the molding machine may be located in a pit below the floor level and the track extend horizontally therefrom instead of being inclined downwardly as shown.

Located beneath the track 1 and supported by two of the standards 4 is a cylinder 5 within which works a piston 6 forming a part of a reciprocating mold-transferring device T later to be referred to. Fluid under pressure is admitted into the cylinder 5 at opposite sides of the piston 6 through two pipe lines 7 and 8 which enter the cylinder at opposite ends. The flow of fluid from a pressure line 9 into the pipe lines 7 and 8 is controlled by a suitable three-way valve 10 of commercial form. A handle 11 is connected to the valve 10 and extends therefrom to a point adjacent the molding machine M and within easy reach of the operator thereof, whereby the flow of liquid under pressure and the movement of the piston is entirely under the control of the operator at all times.

The mold transferring device T previously referred to comprises in addition to the piston 6 the piston-rod 12 to which the piston is secured, which rod is, at its forward end, connected to a cross-head 13 within the opposite ends of which are secured rods 14 and 15 which carry at their forward ends supporting blocks 16. To each of the blocks 16 is pivotally secured a pallet-engaging pawl 17 comprising a normally upstanding end 18 and a weighted lower end 19.

It will be understood that by manipulation of the valve 10 the mold-transferring device T will be reciprocated back and forth in a plane substantially parallel with the track 1.

The molds $m$, shown in dotted lines only, are made in the molding machine M upon suitable pallets $p$ consisting of a plate strengthened at each end by a batten $b$.

The operator then, by manipulation of the valve 10 through the handle 11 exhausts the fluid from one side of the piston 6 through the pipe line 7 and the piston, together with the rest of the mold-transferring device, is driven toward the molding machine from the pressure through the pipe line 8. As the ends 18 of the pawls 17 come into contact with the pallet in the molding machine the pawls are tipped about their axes as shown in dotted lines in Fig. 6, and assume an ineffective position and pass idly beneath the pallet. When the ends 18 have passed from beneath the pallet the pawls, due to weighted ends 19 will, by gravity, assume an upright or effective position as shown in full lines in Figs. 1 and 6. The swinging movement of the pawls into effective position is limited by stop-lugs $16^a$ projecting laterally from the blocks 16 and with which the weighted ends 19 contact.

The operator then by manipulating the valve 10 restores the pressure through the pipe line 7 and exhausts the pressure from the opposite side of the piston through the pipe line 8, thereby causing the mold-transferring device to move to the right, as viewed in Fig. 1 and withdraw the completed mold from the molding machine and convey it a short distance down the track.

The mold-transferring device is guided in its reciprocating movements by guide-bars 20 and 21, located at opposite sides of the track 1 and secured to two of the standards 4. These guide bars are each engaged by spaced wings 13' and 16' forming parts of the cross-head 13 and guide-blocks 16, respectively.

Intermediate the rails 2 and 3, and secured thereto, are pallet-guides 22 and 23 adapted to engage the inner edges of the battens and insure proper alignment of the pallets on the track 1.

While the invention is herein shown and described in its preferred form, it is recognized that various changes may be made in the construction and relation of the parts without departing from the spirit of the invention. It is therefore not intended to limit this application to the construction and arrangement shown but to cover all forms thereof which justly come within the scope of the invention.

Having thus set forth the nature of the invention, what I claim and desire to secure by Letters Patent of the United States is:—

1. In combination with a stationary molding machine, a mold-conveying apparatus active, independently of the mold forming operation, to remove finished molds from the molding machine, said mold-conveying apparatus comprising a stationary inclined track, the upper end of which is adjacent, and independent of said molding-machine and level with the work-table thereof; and a reciprocating pallet-engaging device movable in a plane parallel with the track and having an effective movement in one direction for transferring a mold from said work-table to the track and an ineffective return movement; and manually operated means for controlling the movements of said pallet-engaging device.

2. The combination with a molding machine, of a mold-conveying apparatus including a track, a cylinder, a piston therein, a pallet-engaging member operatively connected with said piston and partaking of the movements thereof, a valve for admitting fluid under pressure into said cylinder at opposite sides of said piston to move said piston in opposite directions, and a controlling handle for said valve located adjacent said molding machine.

3. The combination with a molding machine, of a conveying apparatus comprising a track having one end adjacent said molding machine, a fluid operated mold-transferring device adapted to remove finished molds from said molding machine and convey them along said track, and a guide adapted to engage the pallets of said molds and insure proper alignment of said molds on said track.

4. The combination with a molding machine, of a conveying apparatus comprising a track having one end adjacent said molding machine and consisting of spaced rails, a fluid operated mold-transferring device adapted to remove finished molds from said molding machine and convey them along said track, and a plurality of spaced guides located intermediate said rails and adapted to contact with the pallets of said molds and insure proper alignment of said molds on said track.

5. The combination with a molding machine, of a conveying apparatus comprising a track one end of which is adjacent said molding machine, a fluid operated reciprocating mold-transferring device associated with said track, said mold-transferring device being so constructed and arranged as to permit a portion thereof to be projected beyond the end of said track to engage a pallet of a mold in said molding machine and remove it therefrom and convey it along said track, and means for controlling the movement of said mold-transferring device.

6. A mold-conveying apparatus for molding machines comprising a track independent of the molding machine; a cylinder; a piston movable therein; guide-bars parallel with said track; a cross-head slidable upon said guide-bars; a rod connecting said cross-head with said piston; rods secured at one end in said cross-head and provided at their opposite ends with pawls adapted to engage a mold pallet; and means for selectively effecting and controlling the movement of said piston and connected parts in either of two directions.

7. A mold-conveying apparatus for molding machines comprising a plurality of standards; a track supported thereby independent of the molding machine and entirely at one side thereof; guide-bars sustained by said standards parallel with said track; a fluid-actuated mold-transferring device having a part slidable on said guide-bars, and including two gravity-controlled pallet-engaging pawls active in one direction of movement to transfer a mold from the molding machine to the track, said pawls being free to be swung about their pivots during the return movement of the mold-transferring device; and means for controlling the movement of said transferring device.

8. The combination with a molding machine, of a mold-conveying apparatus including a fluid-operated reciprocating mold-transferring device, a plurality of gravity-controlled pawls pivoted to said mold-transferring device and free to be swung about their pivots, said pawls comprising normally upstanding pallet-engaging ends and weighted lower ends, and stops for limiting the swinging movement of said pawls in one direction.

9. The combination with a molding machine, of a mold-conveying apparatus comprising a track, a cylinder, a fluid-operated piston therein, means for admitting fluid under pressure into said cylinder at opposite sides of said piston to move said piston in opposite directions, a reciprocating mold-transferring device actuated by said piston and provided with pallet-engaging pawls, guide-bars substantially parallel with said track, and spaced wings carried by said mold-transferring device and coacting with said guide-bars to guide said transferring device in its reciprocatory movements.

In witness whereof, I hereunto subscribe my name, as attested by the two subscribing witnesses.

AUGUSTUS N. KELLEY.

Witnesses:
WILLIAM H. PETERS,
H. T. WILLIAMS.